(12) United States Patent
Park et al.

(10) Patent No.: US 9,979,452 B2
(45) Date of Patent: May 22, 2018

(54) METHOD FOR MULTI-USER TRANSMISSION IN A WIRELESS LOCAL AREA NETWORK AND DEVICE FOR SAME

(71) Applicant: LG ELECTRONICS INC., Seoul (KR)

(72) Inventors: Sungjin Park, Seoul (KR); Jinmin Kim, Seoul (KR); Hangyu Cho, Seoul (KR); Kyungtae Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/393,117

(22) Filed: Dec. 28, 2016

(65) Prior Publication Data

US 2017/0187439 A1 Jun. 29, 2017

Related U.S. Application Data

(60) Provisional application No. 62/272,091, filed on Dec. 29, 2015, provisional application No. 62/277,481, filed on Jan. 12, 2016.

(51) Int. Cl.
| | |
|---|---|
| *H04B 7/06* | (2006.01) |
| *H04L 1/00* | (2006.01) |
| *H04L 5/00* | (2006.01) |
| *H04L 27/00* | (2006.01) |
| *H04B 7/0456* | (2017.01) |
| *H04B 7/0452* | (2017.01) |

(Continued)

(52) U.S. Cl.
CPC ......... *H04B 7/0617* (2013.01); *H04B 7/0452* (2013.01); *H04B 7/0456* (2013.01); *H04B 7/0669* (2013.01); *H04B 7/0695* (2013.01); *H04L 1/0003* (2013.01); *H04L 1/0009* (2013.01); *H04L 5/0073* (2013.01); *H04L 27/0008* (2013.01); *H04L 27/2602* (2013.01); *H04B 7/0632* (2013.01); *H04W 72/0446* (2013.01)

(58) Field of Classification Search
CPC .. H04B 7/0452; H04B 7/0617; H04B 7/0619; H04B 7/0623; H04B 7/0626; H04B 7/063; H04B 7/0632; H04L 1/0001; H04L 1/0003; H04W 72/0446
See application file for complete search history.

(56) References Cited

U.S. PATENT DOCUMENTS

2007/0207742 A1* 9/2007 Kim .................. H04B 7/12
455/69
2010/0278225 A1* 11/2010 Chun .................. H04L 5/0007
375/224

(Continued)

*Primary Examiner* — Duc M Nguyen
(74) *Attorney, Agent, or Firm* — Lee Hong Degerman Kang Waimey

(57) ABSTRACT

The present disclosure relates to the operation and configuration of a station and an access point in a wireless LAN (WLAN) system, and more particularly, to a method for efficiently performing multi-user transmission by a station or an access point in a WLAN system and a device for the same. In particular, the present disclosure proposes a method and device for operating a station or an access point supporting multi-user transmission in a Frequency Division Multiple Access (FDMA) scheme or a Multi-User Multi Input Multi Output (MU-MIMO) scheme.

8 Claims, 10 Drawing Sheets

(51) Int. Cl.
*H04L 27/26* (2006.01)
*H04W 72/04* (2009.01)

(56) References Cited

U.S. PATENT DOCUMENTS

| | | | |
|---|---|---|---|
| 2013/0142115 A1* | 6/2013 | Yu | H04W 56/00 370/328 |
| 2013/0188505 A1* | 7/2013 | Nory | H04L 5/0053 370/252 |
| 2014/0071838 A1* | 3/2014 | Jia | H04B 7/04 370/252 |
| 2014/0286203 A1* | 9/2014 | Jindal | H04J 11/0026 370/278 |
| 2016/0044711 A1* | 2/2016 | Lou | H04W 74/0816 370/338 |
| 2016/0353424 A1* | 12/2016 | Stirling-Gallacher | H04B 7/0626 |
| 2017/0033916 A1* | 2/2017 | Stirling-Gallacher | H04L 5/1438 |
| 2017/0063503 A1* | 3/2017 | Liu | H04L 5/0048 |
| 2017/0093474 A1* | 3/2017 | Lee | H04B 7/0486 |
| 2017/0201893 A1* | 7/2017 | Seol | H04W 16/28 |
| 2017/0202027 A1* | 7/2017 | Son | H04W 74/0833 |

\* cited by examiner

METHOD FOR MULTI-USER TRANSMISSION IN A WIRELESS LOCAL AREA NETWORK AND DEVICE FOR SAME

BACKGROUND OF THE INVENTION

Field of the Invention

The following disclosure relates to the operation and configuration of a station and an access point in a wireless LAN (WLAN) system, and more particularly, to a method for efficiently performing multi-user transmission by a station or an access point in a WLAN system and a device for the same.

Discussion of the Related Art

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

Meanwhile, IEEE 802.11ad defines performance enhancement for high-speed throughput in the 60 GHz band, and IEEE 802.11ay, for introducing channel bonding and MIMO technology to IEEE 802.11ad systems for the first time, is being discussed.

SUMMARY OF THE INVENTION

Research is demanded on a method for an access point (AP) to transmit data signals to a plurality of stations (STAs) in the 60 GHz band.

Particularly, there is a need for research on a method for the AP to efficiently transmit data signals to a plurality of STAs in the 60 GHz band by Frequency Division Multiple Access (FDMA) or Multi-User-Multiple Input Multiple Output (MU-MIMO).

To achieve these objects and other advantages and in accordance with the purpose of the invention, as embodied and broadly described herein, a method for transmitting a data signal to a plurality of stations (STAs) by an access point (AP) in a wireless local area network (WLAN) system, the method including receiving, from the plurality of STAs, information on a best sector for each of the STAs from the AP, transmitting, to the plurality of STAs, a setup frame containing reception beam pattern information for the plurality of STAs by applying Modulation and Coding Scheme (MCS) level 0, and transmitting a data signal to the plurality of STAs by applying an MCS level higher than MCS level 0.

Here, the data signal may be in a Frequency Division Multiple Access (FDMA) scheme or a Multi-User Multi Input Multi Output (MU-MIMO) scheme.

In this case, the setup frame may contain indicator information indicating whether the data signal is transmitted in the MU-MIMO scheme or the FDMA scheme.

In addition, the setup frame may be transmitted in a broad-beam pattern including all the best sectors of the plurality of STAs.

For example, the AP may transmit the data signal via a single radio frequency (RF) module.

As another example, the AP may transmit the data signal through a plurality of radio frequency (RF) modules, wherein the RF modules may transmit the data signal using different frequency resources.

In another aspect of the present invention, a method for supporting multi-user transmission by a station (STA) in a wireless local area network (WLAN) system includes acquiring information on a best sector of the STA during association with an access point (AP) and transmitting the information on the best sector to the AP, receiving a setup frame containing reception beam pattern information for a plurality of STAs from the AP by operating in an omni reception mode, and receiving a data signal from the AP by operating in a directional reception mode according to reception beam pattern information corresponding to the STA in the reception beam pattern information for the plurality of STAs contained in the setup frame, wherein the setup frame is transmitted by applying Modulation and Coding Scheme (MCS) level 0, wherein the data signal is transmitted by applying an MCS level higher than the MCS level 0.

Here, the data signal may be transmitted in a Frequency Division Multiple Access (FDMA) scheme or a Multi-User Multi Input Multi Output (MU-MIMO) scheme.

In this case, the setup frame may contain indicator information indicating whether the MU-MIMO scheme or the FDMA scheme is applied.

In addition, the operating in the directional reception mode may be performed according to reception beam pattern information corresponding to ID information of the STA in the reception beam pattern information for the plurality of STAs.

In addition, the STA may receive the data signal through a frequency resource allocated to the STA.

Additionally, the method may further include transmitting, to the AP, information about whether the STA supports the multi-user transmission.

In another aspect of the present invention, an access point operating in a wireless local area network (WLAN) system includes a transceiver having one or more Radio Frequency (RF) chains and configured to transmit and receive signals to and from a station (STA), and a processor connected to the transceiver to process the signals transmitted and received by the transceiver, wherein the processor is configured to perform a control operation to receive, from the plurality of STAs, information on a best sector for each of the STAs from the AP, perform a control operation to transmitting, to the plurality of STAs, a setup frame containing reception beam pattern information for the plurality of STAs by applying Modulation and Coding Scheme (MCS) level 0, and perform a control operation to transmit a data signal to the plurality of STAs by applying an MCS level higher than MCS level 0.

In another aspect of the present invention, a station (STA) operating in a wireless local area network (WLAN) system includes a transceiver having one or more Radio Frequency (RF) chains and configured to transmit and receive signals to and from an access point (AP), and a processor connected to the transceiver to process the signals transmitted and received by the transceiver, wherein the processor is configured to perform a control operation to acquire information on a best sector of the STA during association with the AP and transmit the information on the best sector to the AP, perform a control operation to receive a setup frame containing reception beam pattern information for a plurality of STAs from the AP by operating in an omni reception mode, and perform a control operation to receive a data signal from the AP by operating in a directional reception mode according to reception beam pattern information corresponding to the STA in the reception beam pattern information for the plurality of STAs contained in the setup frame, wherein the setup frame is transmitted by applying Modulation and Coding Scheme (MCS) level 0, wherein the data signal is transmitted by applying an MCS level higher than the MCS level 0.

According to embodiments of the present invention, an access point (AP) may efficiently transmit a data signal to a plurality of stations (STA), and the plurality of STAs may efficiently receive the data signal in a 60 GHz band.

In particular, according to embodiments of the present invention, the AP may efficiently transmit a data signal to a plurality of STAs in the 60 GHz band in the Frequency Division Multiple Access (FDMA) scheme or Multi-User Multiple Input Multiple Output (MU-MIMO) scheme.

The effects that may be obtained by the present invention are not limited to the above-mentioned effects, and other effects not mentioned above will be clearly understood by those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

1. Wireless LAN (WLAN) System 1-1. Generals of WLAN System

Figure 1:
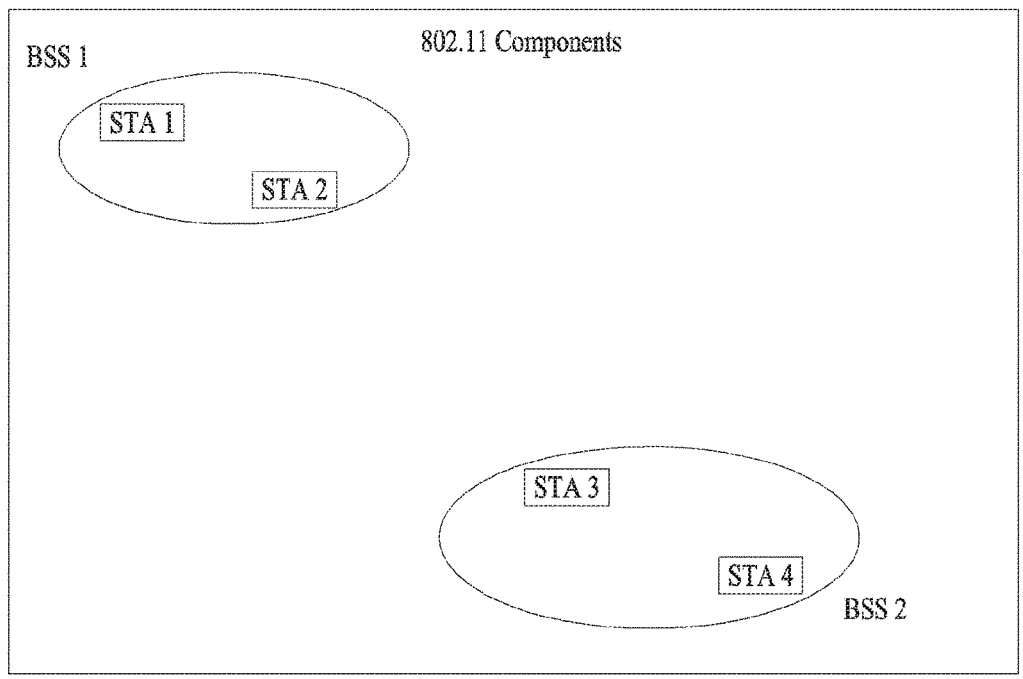
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
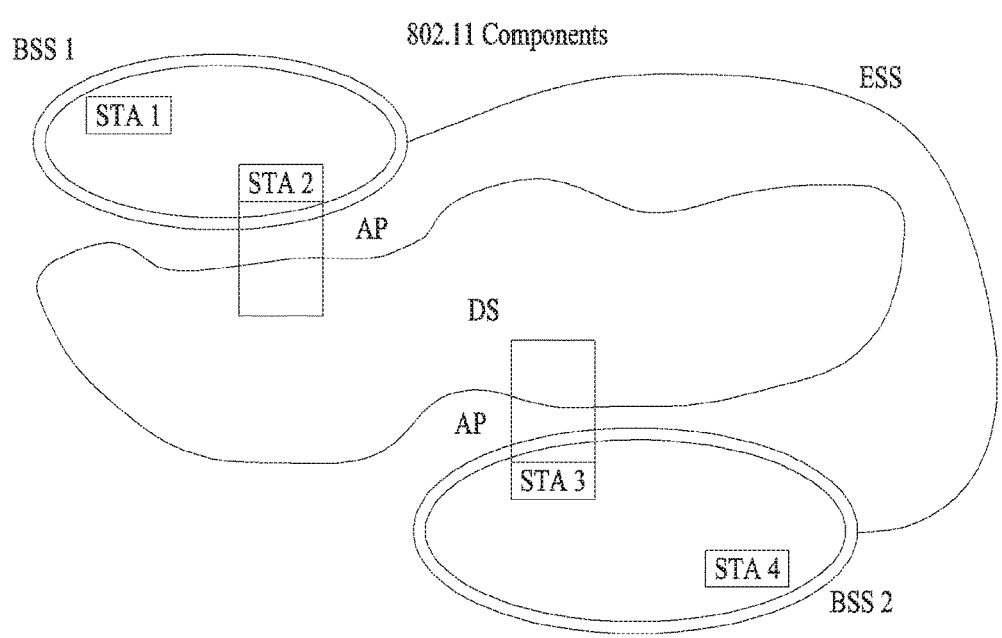
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel bonding in the WLAN system will be described.

1-2. Channel Bonding in WLAN System

Figure 3:
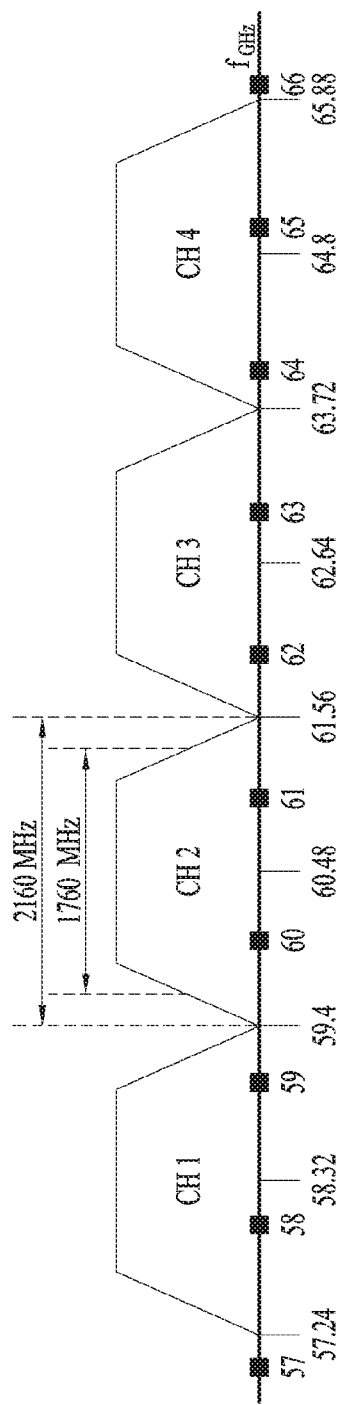
FIG. 3 is a diagram illustrating a channel in a 60 GHz band for explaining a channel bonding operation according to an embodiment of the present invention.

FIG. 3 is a diagram illustrating a channel in a 60 GHz band for explaining a channel bonding operation according to an embodiment of the present invention.

As shown in FIG. 3, four channels may be configured in the 60 GHz band, and the typical channel bandwidth may be 2.16 GHz. The ISM band (57 GHz to 66 GHz) available at 60 GHz may be specified differently for different countries. In general, channel 2 of the channels shown in FIG. 3 is available in all regions and may be used as a default channel. Most of the regions, except Australia, may use channels 2 and 3, which may be utilized for channel bonding. However, the channels used for channel bonding may vary, and the present invention is not limited to a specific channel.

Figure 4:
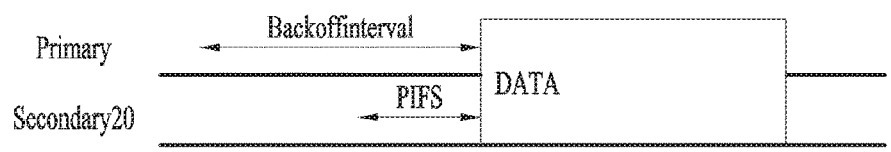
FIG. 4 illustrates a basic method of performing channel bonding in a WLAN system.

FIG. 4 illustrates a basic method of performing channel bonding in a WLAN system.

The example of FIG. 4 illustrates the operation of 40 MHz channel bonding performed by combining two 20 MHz channels in the IEEE 802.11n system. For IEEE 802.11ac, 40/80/160 MHz channel bonding may be performed.

The two channels exemplarily shown in FIG. 4 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel.

In the case where channel bonding is performed based on contention as shown in FIG. 4, channel bonding is allowed only when the secondary channel remains idle for a predetermined time at the time when the backoff count for the primary channel expires, and therefore the application of channel bonding is very limited, and it is difficult to flexibly cope with the media situation.

Accordingly, in one aspect of the present invention, an AP may transmit scheduling information to STAs to perform access based on scheduling. Meanwhile, in another aspect of the present invention, channel access may be performed based on the above-described scheduling or on contention independently of the above-described scheduling. In yet another aspect of the present invention, communication may be performed based on beamforming using a spatial sharing technique.

1-3. Beacon Interval Configuration

Figure 5:
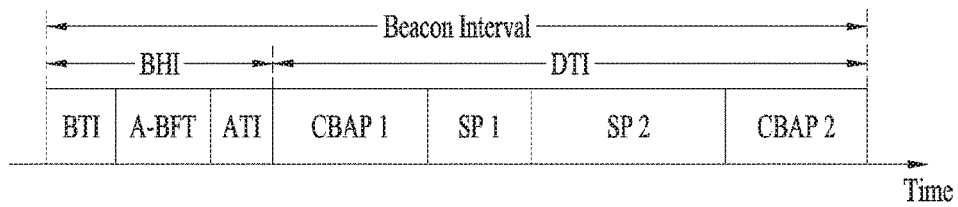
FIG. 5 is a diagram illustrating configuration of a beacon interval.

FIG. 5 is a diagram illustrating configuration of a beacon interval.

In 11ad-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 4.

The BTI refers to an interval during which one or more DMG beacon frames may be transmitted. The A-BFT interval refers to an interval during which beamforming training is performed by an STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

Hereinafter, the physical layer configuration in a WLAN system to which the present invention is applied will be described in detail.

1-4. Physical Layer Configuration

It is assumed that the following three different modulation modes may be provided in the WLAN system according to an embodiment of the present invention.

TABLE 1

| PHY | MCS | Note |
| --- | --- | --- |
| Control PHY | 0 | |
| Single carrier PHY | 1 . . . 12 | (low power |
| (SC PHY) | 25 . . . 31 | SC PHY) |
| OFDM PHY | 13 . . . 24 | |

Such modulation modes may be used to satisfy different requirements (e.g., high throughput or stability). Depending on the system, only some of these modes may be supported.

Figure 6:
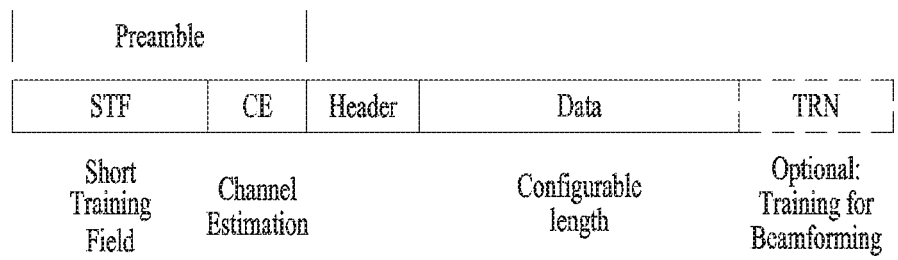
FIG. 6 is a diagram illustrating a physical configuration of an existing radio frame.

FIG. 6 is a diagram illustrating a physical configuration of an existing radio frame.

It is assumed that all the Directional Multi-Gigabit (DMG) physical layers include fields as shown in FIG. 6 in common. However, depending on the respective modes, physical layers may have a different method of defining individual fields and use a different modulation/coding scheme.

As shown in FIG. 6, the preamble of a radio frame may include a Short Training Field (STF) and Channel Estimation (CE). In addition, the radio frame may include a header and a data field as payload, and selectively include a TRN (Training) field for beamforming.

Figure 7:
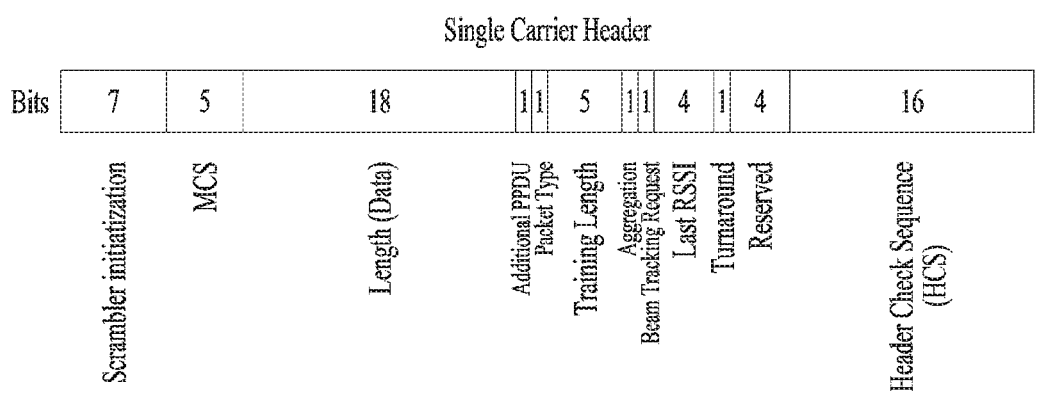
FIGS. 7 and 8 are diagrams illustrating configuration of the header field of the radio frame of FIG. 6.
Figures 8, 9:
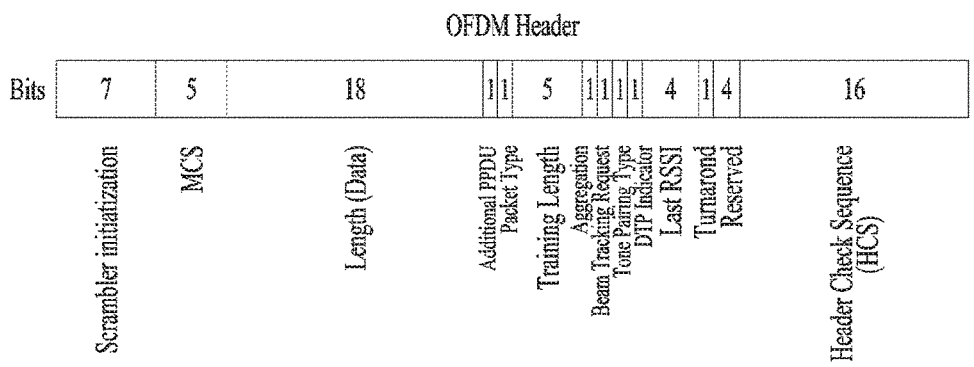
FIG. 9 is a diagram showing a PPDU structure applicable to the present invention.

FIGS. 7 and 8 are diagrams illustrating configuration of the header field of the radio frame of FIG. 6.

Specifically, FIG. 7 illustrates a case where an Single Carrier (SC) mode is used. In the SC mode, the header may include information indicating an initial value of scrambling, a Modulation and Coding Scheme (MCS), information indicating the length of data, information indicating the presence or absence of an additional Physical Protocol Data Unit (PPDU), a packet type, a training length, an aggregation status, a beam tracking request status, a last Received Signal Strength Indicator (RSSI), a truncation status, and a Header Check Sequence (HCS). In addition, as shown in FIG. 7, the header has 4 reserved bits. The reserved bits may be utilized in the following description.

FIG. 8 specifically illustrates configuration of a header in a case where the OFDM mode is applied. The OFDM header may include information indicating an initial value of scrambling, an MCS, information indicating the length of data, information indicating the presence or absence of additional PPDU, a packet type, a training length, an aggregation status, a beam tracking request status, a last RSSI, a truncation status, and an HCS. In addition, as shown in FIG. 8, the header has 2 reserved bits. The reserved bits may be utilized in the following description as in the case of FIG. 7.

As described above, the IEEE 802.11ay system is considering introduction of channel bonding and MIMO technology in the legacy 11ad system for the first time. In order to implement channel bonding and MIMO in 11ay, a new PPDU structure is needed. In other words, the existing 11ad PPDU structure has limitations in supporting legacy UEs and implementing channel bonding and MIMO.

For this, a legacy preamble for supporting a legacy UE and a new field for a 11ay UE following a legacy header field may be defined, and channel bonding and MIMO may be supported through the newly defined field.

FIG. 9 is a diagram showing a PPDU structure according to a preferred embodiment of the present invention. In FIG. 9, the abscissa may correspond to the time domain, and the ordinate may correspond to the frequency domain.

When two or more channels are bonded, a frequency band (for example, a 400 MHz band) may exist between frequency bands (e.g., 1.83 GHz) used in the respective channels. In the mixed mode, a legacy preamble (legacy STF, legacy CE) is transmitted in duplicate through each channel. In an embodiment of the present invention, transmitting the new STF and CE field (gap filling) preamble through the 400 MHz band between the channels along with transmission of the legacy preamble may be considered.

In this case, as shown in FIG. 9, in the PPDU structure according to the present invention, ay STF, ay CE, ay header B, and payload are transmitted over broadband after a legacy preamble, a legacy header and an ay header A. Therefore, the ay header, ay Payload field, and the like to be transmitted after the header field may be transmitted through channels used for bonding. In order to distinguish the ay header from the legacy header, the ay header may be referred to as an enhanced directional multi-gigabit (EDMG) header, or "ay header" and "EDMG header" may be interchangeably used.

For example, a total of six channels (2.16 GHz) may be present in 11ay, and up to four channels may be bonded and transmitted to a single STA. Thus, the ay header and the ay payload may be transmitted over bandwidths of 2.16 GHz, 4.32 GHz, 6.48 GHz, and 8.64 GHz.

Alternatively, the PPDU format used when the legacy preamble is repeatedly transmitted without performing the gap-filling described above may also be considered.

In this case, the gap-filling is not performed, and thus the ay STF, ay CE, and ay header B are transmitted in a wideband after the legacy preamble, legacy header, and ay header A, without the GF-STF and GF-CE field indicated by the dotted line in FIG. 9.

2. Beam Forming Operation According to the Present Invention

In a super high frequency band such as the 60 GHz band as proposed in the present invention, path loss is large due to characteristics of radio waves. Accordingly, in the 11ay system according to the present invention, an array antenna may be used to perform directional transmission.

However, when data or signals are directionally transmitted using a narrow beam pattern, whether a plurality of UEs are supported may depend on the locations of the UEs to receive the data or signals.

In view of the above, the present invention proposes Multi-User Multiple Input Multiple Output (MU-MIMO) or Frequency Division Multiple Access (FDMA) capable of simultaneously supporting a large number of users regardless of the locations of UEs.

2-1. Beam Pattern According to Locations of STAs and the Number of RF Modules of a PCP/AP The PCP/AP and the plurality of STAs may be associated with each other through sector level switching (SLS), and the plurality of STAs and the PCP/AP may acquire information on the best sector in which they may receive data or signals from each other. The best sectors from the PCP/AP may be the same or different from each other depending on the locations of the plurality of STAs.

In this regard, it may be assumed that the following is applied to the present invention.

(1) Beamforming is already preformed. Therefore, the STA has the best sector associated with SLS from PCP/AP can be reused.

(2) Preferably, only DL FDMA transmission is considered in single BSS.

Hereinafter, configurations applicable to the present invention are divided into a single RF case based on a single RF module and a multi RF case based on a plurality of RF modules, and each configuration will be described in detail.

2-1-1. Single RF Case 2-1-1-1. When one or more STAs are located apart from each other or the best sectors from the PCP/AP for the one or more STAs are different from each other In order for the PCP/AP to support FDMA transmission, it should support different STAs simultaneously. In this case, if a single RF module is used, the present invention may simultaneously support a plurality of STAs through the following method.

(1) Covering Multiple Sectors with One Broad Beam

Figure 10:
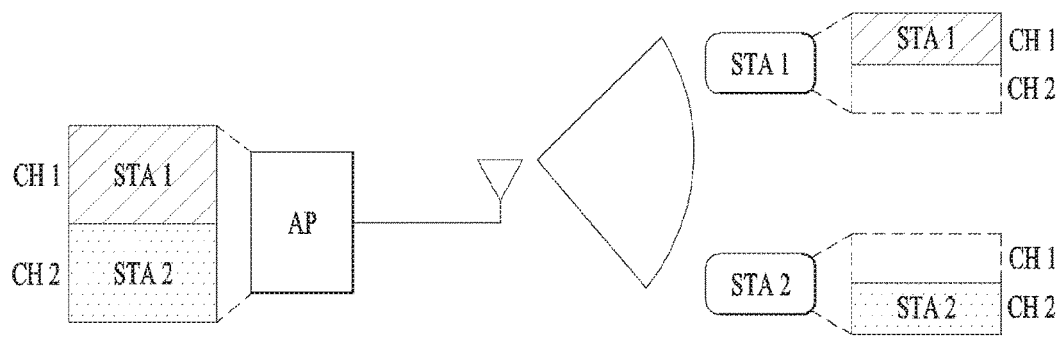
FIGS. 10 to 13 illustrate a multi-user transmission operation applicable to the present invention.

FIG. 10 is a diagram illustrating a configuration for covering a plurality of sectors with a single broad beam.

As shown in FIG. 10, the PCP/AP may support the plurality of STAs by forming a broad beam including a plurality of STAs participating in FDMA.

More specifically, the PCP/AP may transmit data or signals through a wide-band beam, and the plurality of STAs may receive data or signals as many as a resource unit allocated to each STA. Specifically, the plurality of STAs may receive data or signals in an FDMA scheme through frequency resources allocated to each STA.

At this time, the plurality of STAs may report information on the best sectors to the PCP/AP in the association process, and report information such as a signal-to-noise ratio (SNR)/ signal to interference plus noise ratio (SINR)/received signal strength indicator (RSSI) at the same time. Additionally, each STA may signal whether each STA supports the FDMA transmission scheme through a 1-bit indicator.

The PCP/AP may transmit data or signals to STAs capable of receiving a broad beam, using the above information in the FDMA scheme. In this case, the broad beam pattern can be made easily but the antenna gain may be low).

(2) Covering Multiple Sectors with two Narrow Beams

Figure 11:
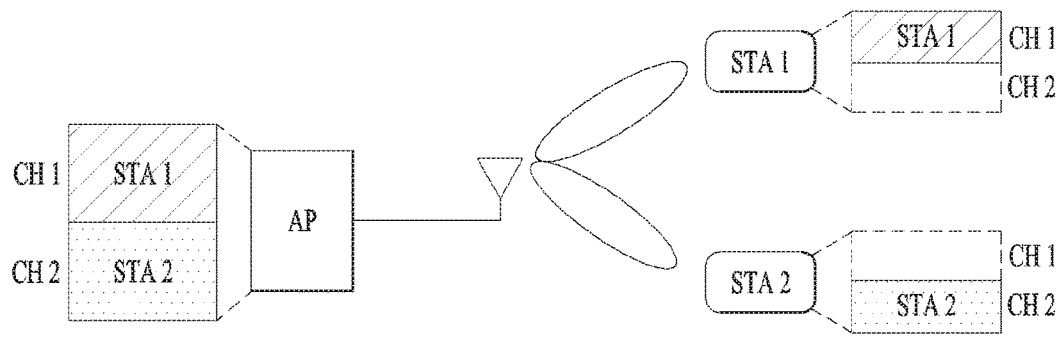

FIG. 11 is a diagram illustrating a configuration for covering a plurality of sectors with a plurality of narrow beams.

As shown in FIG. 11, the PCP/AP may support a plurality of STAs by forming a beam (e.g., a combination of a plurality of directional beams) including a plurality of STAs participating in FDMA. While FIG. 11 illustrates that the PCP/AP including a single RF module forms two narrow beams to cover two sectors, the PCP/AP may form as many narrow beams as the STAs to cover a plurality of sectors in an embodiment.

However, forming a plurality of narrow beams by using a single RF module may be difficult to implement, but may increase antenna gain.

As in the case of "Covering multiple sectors with one broad beam" described above, the plurality of STAs may receive data or signals as many as resource units allocated to each STA. Specifically, the plurality of STAs may receive data or signals in an FDMA manner through frequency resources allocated to each STA. In addition, the plurality of STAs report information on the best sectors to the PCP/AP in the association process, and at the same time, report a signal-to-noise ratio (SNR)/signal to interference plus noise ratio (SINR)/received signal strength indicator (RSSI) as well. Additionally, each STA may signal whether each STA supports the FDMA transmission scheme through a 1-bit indicator.

2-1-1-2. When one or more STAs are located close to each other or the best sectors from the PCP/AP for the one or more STAs are the same (1) Covering Only One Sector with One Narrow Beam FIG. 12 is a diagram illustrating a configuration for covering one sector with a single narrow beam.

Figure 12:
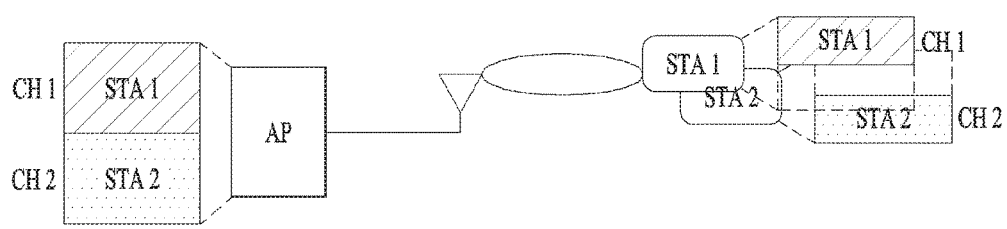

As shown in FIG. 12, the PCP/AP may support one or more STAs having the same best sector using a predetermined sector in the SLS step, or may form a new narrow beam to support one or more nearby STAs.

According to this configuration, a sector determined in the existing beamforming procedure may be reused, and a plurality of STAs may be supported through one RF module. Further, in this case, the FDMA may be more effective than the MU-MIMO supporting a plurality of STAs.

2-1-2. Multiple RFs Case 2-1-2-1. When one or more STAs are located apart from each other or the best sectors from the PCP/AP for the one or more STAs are different from each other FIG. 13 is a diagram illustrating a configuration for covering a plurality of sectors with a plurality of narrow beams.

Figure 13:
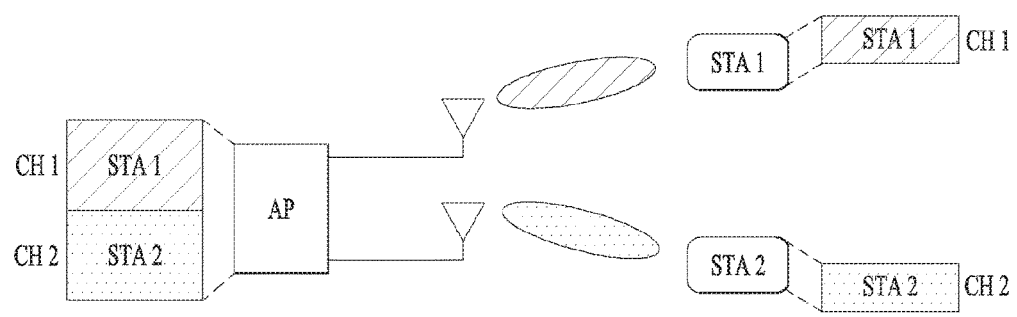

As shown in FIG. 13, the PCP/AP may transmit data or signals through a plurality of RF modules to support a plurality of STAs participating in FDMA. Each RF module may transmit data or signals using different frequency bands divided by resource units (RU).

For example, as shown in FIG. 13, the PCP/AP may transmit data or signals on channel 1 and channel 2. In this case, one RF module may support STA 1 using channel 1, and the other RF module may support STA 2 using channel 2. For the beam pattern formed by each RF module, an antenna weight pattern (AWV) corresponding to the sector used in the SLS step may be reused.

In this structure, if the frequency bands used in the respective RF modules are identical to each other, the PCP/AP may support MU-MIMO. If the number of RF modules becomes larger than the number of STAs, the PCP/AP may support both FDMA and MIMO. That is, the PCP/AP may selectively use MIMO, OFDMA, OFDMA-MIMO, and the like depending on the number of RF modules in one structure in consideration of the channel environment or physical capabilities of each STA.

Additionally, in this case, various parameter values utilized for channel aggregation may be reused, and multiple CCAs and directional CCAs may also be reused.

2-1-2-2. When one or more STAs are located close to each other or the best sectors from the PCP/AP for the one or more STAs are the same Similar to the case described above, if the PCP/AP includes a plurality of RF modules, the PCP/AP may support a plurality of STAs positioned close to each other by reusing a beam pattern corresponding to a sector used in the SLS step. Here, each RF module may transmit data or signals using different frequency bands divided by resource units (RU).

For example, as shown in FIG. 13, the PCP/AP may transmit data or signals on channel 1 and channel 2. In this case, one RF module may support STA 1 using channel 1, and the other RF module may support STA 2 using channel 2. For the beam pattern formed by each RF module, an antenna weight pattern (AWV) corresponding to the sector used in the SLS step may be reused.

In this structure, if the frequency bands used in the respective RF modules are identical to each other, the PCP/AP may support MU-MIMO.

In addition, in the case of the SU (Single User) situation in this structure, each RF module of the PCP/AP may also support channel aggregation by using different frequency resource units. In this case, the RF modules of the PCP/AP may transmit data or signals for only the same STA using different frequency resources.

As described above, the PCP/AP may selectively support FDMA, SU/MU MIMO, channel bonding, and channel aggregation according to the number of RF modules, the beam pattern, and the capabilities of the STA.

If the PCP/AP is capable of simultaneously supporting various transmission schemes, the PCP/AP may indicate a transmission scheme to perform, through the DMG header or the EDMG header A of the PPDU. For example, the PCP/AP may inform the STA of the transmission scheme, SU or MU, through a first bit of 1-bit size included in the DMG header or EDMG header A. If the first bit indicates the MU scheme, the PCP/AP informs the STA of the applied scheme, MIMO or FDMA, through a second bit of 1-bit size included in the DMG Header or EDMG Header A of the PPDU to be transmitted.

2-2. Multi-User (MU) Procedure

Hereinafter, a method of performing MU transmission between a PCP/AP and a plurality of STAs will be described in detail with reference to the above-described methods. Specifically, the present invention proposes a method of increasing the receive antenna gain of each STA instead of reducing the transmit antenna gain of the PCP/AP to ensure efficient data or signal transmission/reception between the PCP/AP and a plurality of STAs.

Figure 14:
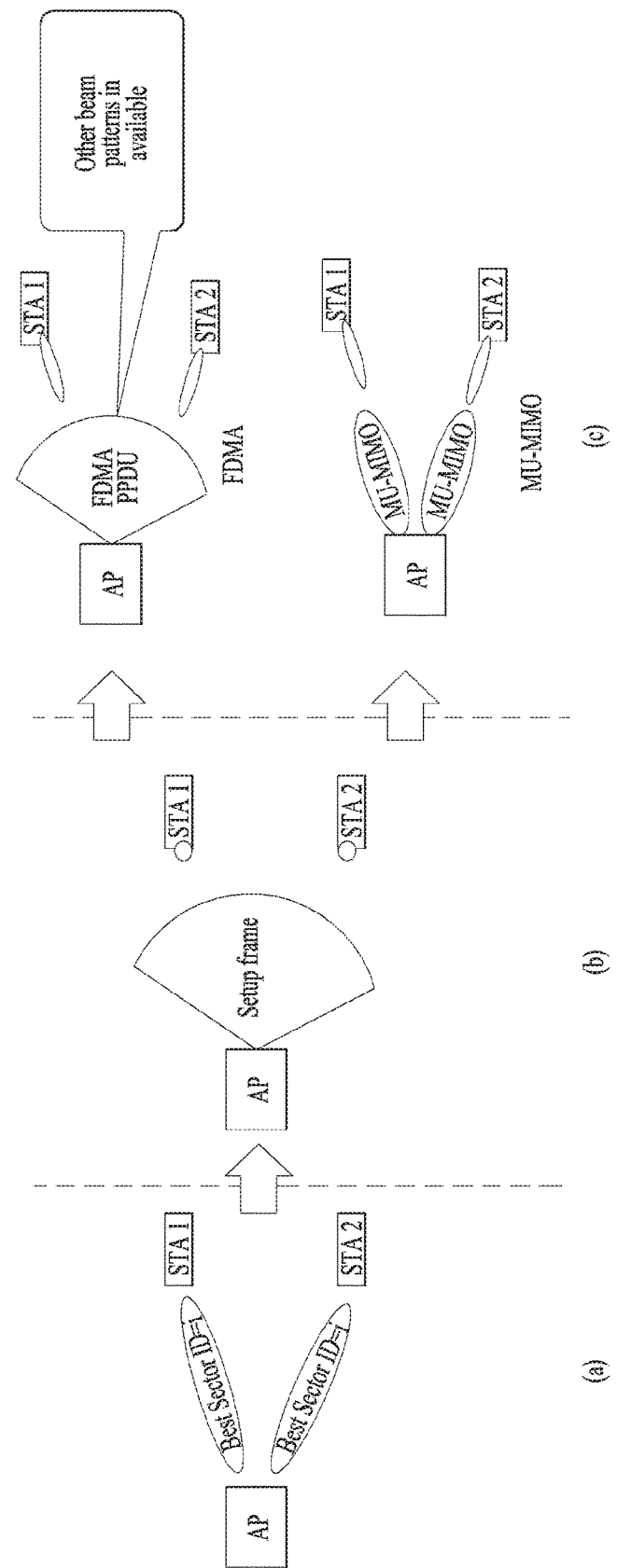
FIG. 14 is a diagram illustrating a method of performing multi-user transmission by an access point and a station according to an embodiment of the present invention.

FIG. 14 is a diagram illustrating a method of performing MU transmission by an AP and an STA according to an embodiment of the present invention.

As shown in FIG. 14(*a*), the PCP/AP and a plurality of STAs are associated through the SLS step. In the association step, a plurality of STAs acquires information on the best sector from the PCP/AP, and reports the information on the best sector to the PCP/AP. Additionally, the plurality of STAs may report SNR/SINR/RSSI together with the information on the (best) beam sectors. In addition, each STA may transmit, to the PCP/AP, information about whether each STA is capable of supporting MU transmission.

Through the association step, the PCP/AP may know the best sector for each STA, and may acquire capability information on whether the plurality of STAs supports FDMA or MIMO.

As shown in FIG. 14(*b*), the PCP/AP transmits a setup frame to the plurality of STAs before transmitting data or signals based on MU transmission. At this time, the PCP/AP may transmit the setup frame by forming a broad beam pattern so as to include as many best sectors for the plurality of STAs as possible. Preferably, the PCP/AP may form a broad beam pattern including all the best sectors for the plurality of STAs. Alternatively, the PCP/AP may perform transmission by increasing the coverage of the setup frame so as to include the plurality of STAs in the coverage area. To this end, the PCP/AP may transmit the setup frame using a control PHY set to MCS level 0.

The setup frame includes reception beam pattern information about the plurality of STAs. Accordingly, the setup frame may include information on the MAC addresses or AIDs (or Group IDs) of the STAs receiving the MU-MIMO or FDMA PPDU, and may thus indicate reception beam pattern information corresponding to a specific STA. In a preferred embodiment applicable to the present invention, the setup frame may be transmitted in a broad beam pattern including all best sectors for the plurality of STAs.

In addition, the setup frame may further include indicator information indicating whether the setup frame is a setup frame for MU-MIMO or a setup frame for FDMA. Here, the indicator information may have a size of 1 bit.

In an embodiment applicable to the present invention, the setup frame may be transmitted using a control frame such as a conventionally defined RTS (Ready-To-Send)/CTS (Clear-To-Send) frame, and relevant information may be transmitted through the reserved bits or the TRN field in the control frame.

The plurality of STAs may operate in an omni reception mode to receive the setup frame in response. Here, the omni reception mode may include an Omni CCA operation.

After decoding the setup frame, the plurality of STAs may change the reception mode to a directional reception mode using a reception beam pattern corresponding to the ID information thereof. Here, the directional reception mode may include the directional CCA operation. Accordingly, the plurality of STAs increase the antenna gain for the data or signal transmitted from the PCP/AP, and accordingly may receive the data or signal even if the PCP/AP transmits the data or the signal with a low antenna gain.

As shown in FIG. 14(c), the PCP/AP may apply an MCS level of an order higher than the control PHY (MCS 0) used in the previous two steps to transmit data or a signal to the plurality of STAs in the MU-MIMO or FDMA scheme.

More specifically, when transmitting data or signals in the FDMA scheme, the PCP/AP may use various beam patterns. For example, the PCP/AP may transmit data or signals to the plurality of STAs through a broad beam at an MCS level higher than MCS level 0. As described above, this transmission scheme may be performed not only by a PCP/AP including a single RF module but also by a PCP/AP including a plurality of RF modules. Alternatively, the PCP/AP may transmit the data or the signal in the FDMA scheme using the aforementioned narrow beam pattern or broad beam pattern according to the locations of the STAs, the physical capabilities of the PCP/AP and the STAs (e.g., the number of RF modules, whether wide band processing is supported).

When transmitting data or signals in the MU-MIMO scheme, the PCP/AP may form a plurality of narrow beams corresponding to the best sector for each STA using one or more RF modules. Even in this case, the PCP/AP may transmit the data or signals at an MCS level higher than MCS level 0.

The plurality of STAs changes the reception mode to the directional reception mode using the reception beam pattern information included in the previously received setup frame in response. Accordingly, as shown in FIG. 14(c), the plurality of STAs operates in a reception mode optimized for receiving data or signals transmitted by the PCP/AP. Therefore, the plurality of STAs may efficiently receive data or signals of an MCS level higher than MCS level 0, at which signals are transmitted only in a short range due to the signal characteristics.

The PCP/AP implementing the method shown in FIG. 14 may include a single RF module or include a plurality of RF modules.

Additionally, the PCP/AP according to the present invention may indicate a transmission scheme performed by the PCP/AP, through the DMG header or the EDMG header A of the PPDU to be transmitted. For example, the PCP/AP may inform the STA of the transmission scheme, SU or MU, through a first bit, which is 1 bit, included in the DMG header or EDMG header A. If the first bit indicates the MU scheme, the PCP/AP informs the STA of the applied scheme, MIMO or FDMA, through a second bit, which is 1 bit, included in the DMG Header or EDMG Header A of the PPDU to be transmitted.

3. Device Configuration

Figure 15:
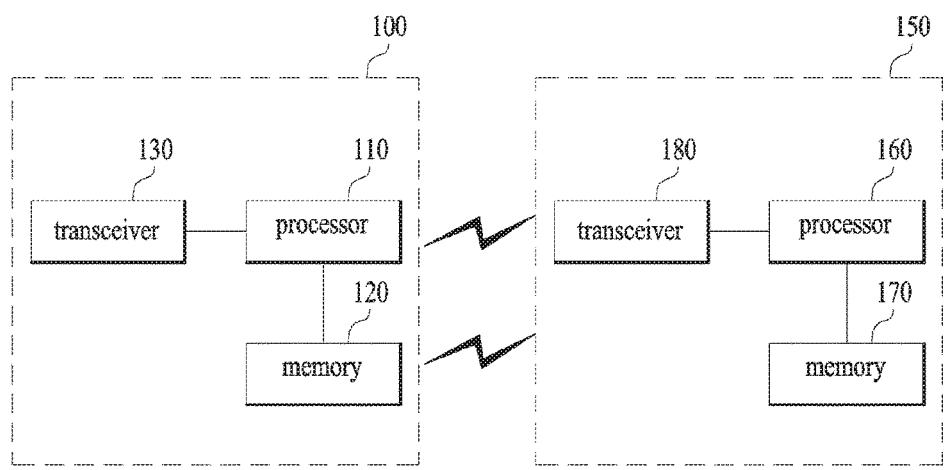
FIG. 15 is a diagram illustrating devices for implementing the above-described method.

FIG. 15 is a diagram illustrating devices for implementing the above-described method.

The wireless device 100 of FIG. 15 may correspond to a specific STA of the above description, and the wireless device 150 may correspond to the PCP/AP of the above description.

The STA 100 may include a processor 110, a memory 120 and a transceiver 130. The PCP/AP 150 may include a processor 160, a memory 170, and a transceiver 180. The transceivers 130 and 180 may transmit/receive wireless signals and may be implemented in a physical layer such as IEEE 802.11/3GPP. The processors 110 and 160 are implemented in the physical layer and/or MAC layer and are connected to the transceivers 130 and 180. The processors 110 and 160 may perform the UL MU scheduling procedure described above.

The processors 110 and 160 and/or the transceivers 130 and 180 may include application specific integrated circuits (ASICs), other chipsets, logic circuits, and/or data processors. The memories 120 and 170 may include a read-only memory (ROM), a random access memory (RAM), a flash memory, a memory card, a storage medium and/or other storage units. When an embodiment is executed by software, the method described above may be executed as a module (e.g., a process, a function) that performs the functions described above. The module may be stored in the memory 120,170 and executed by the processor 110,160. The memory 120, 170 may be located inside or outside the processor 110, 160 and may be connected to the processor 110, 160 by a well-known means.

The detailed description of preferred embodiments of the invention set forth above is provided to enable those skilled in the art to implement and practice the invention. Although the present invention has been fully described by way of example with reference to the accompanying drawings, it is to be understood that various modifications and changes may be made in the invention without departing from the scope and spirit of the invention. Accordingly, the present invention is not intended to be limited to the embodiments disclosed herein but is to be accorded the widest scope consistent with the principles and novel features disclosed herein.

What is claimed is:

1. A method for transmitting a data signal to a plurality of stations (STAs) by an access point (AP) in a wireless local area network (WLAN) system, the method comprising:
receiving, from the plurality of first STAs, information on a best sector for each of the STAs from the AP;
transmitting, to the plurality of first STAs, a setup frame including:
first information indicating a plural second STAs among the plurality of first STAs, and second information indicating that the setup frame corresponds to a setup frame for a multi user-multiple input multiple output (MU-MIMO) scheme or a setup frame for a frequency division multiplexing access (FDMA) scheme, in order to change a reception mode of the plural STAs; and transmitting a data signal to the plural second STAs through a plurality of radio frequency (RF) modules by applying a Modulation and Coding Scheme (MCS) level higher than MCS level 0 and using the MU-MIMO scheme or the FDMA scheme according to indication of the second information, wherein the setup frame is transmitted by applying MCS level 0, wherein a data signal corresponding to each of the plural second STAs is transmitted using a best sector for each of the plural STAs through a corresponding RF module among the plurality of RF modules, and wherein, when the data signal is transmitted by using the MU-MIMO scheme, frequency bands operated by the plurality of RF modules are identical.

2. The method according to claim 1, wherein the setup frame is transmitted in a broad-beam pattern including all the best sectors of the plurality of first STAs.

3. The method according to claim 1, wherein the setup frame is transmitted in order to make the reception mode of the plural second STAs change from an omni reception mode to a directional reception mode for the AP.

4. A method for supporting multi-user transmission by a station (STA) in a wireless local area network (WLAN) system, the method comprising:

acquiring information on a best sector of the STA during association with an access point (AP) and transmitting the information on the best sector to the AP;

receiving a setup frame including:
first information indicating a plural second STAs among a plurality of first STAs, and
second information indicating that the setup frame corresponds to a setup frame for a multi user-multiple input multiple output (MU-MIMO) scheme or a setup frame for a frequency division multiplexing access (FDMA) scheme from the AP by operating in an omni reception mode;

when the setup frame is received, changing an reception mode of the STA from the omni reception mode to a directional reception mode according to the information on the best sector; and receiving a data signal from the AP by operating in the directional reception mode according to the information on the best sector by using the MU-MIMO scheme or the FDMA scheme according to indication of the second information, wherein the setup frame is transmitted by applying Modulation and Coding Scheme (MCS) level 0, and wherein the data signal is transmitted by applying an MCS level higher than the MCS level 0.

5. The method according to claim 4,
wherein the STA receives the data signal through a frequency resource allocated to the STA.

6. The method according to claim 4, further comprising:
transmitting, to the AP, information about whether the STA supports the multi-user transmission.

7. An access point operating in a wireless local area network (WLAN) system, the access point comprising:
a transceiver having one or more Radio Frequency (RF) chains and configured to transmit and receive signals to and from a station (STA); and
a processor connected to the transceiver to process the signals transmitted and received by the transceiver,
wherein the processor controls the transceiver to:
receive, from the plurality of first STAs, information on a best sector for each of the STAs;
transmit, to the plurality of first STAs, a setup frame including:
first information indicating a plural STAs among the plurality of first STAs, and
second information indicating that the setup frame corresponds to a setup frame for a multi user-multiple input multiple output (MU-MIMO) scheme or a setup frame for a frequency division multiplexing access (FDMA) scheme, in order to make an reception mode of the plural STAs change; and
transmit a data signal to the plural second STAs through a plurality of radio frequency (RF) modules by applying a a Modulation and Coding Scheme (MCS) level higher than MCS level 0 and using the MU-MIMO scheme or the FDMA scheme according to indication of the second information,
wherein the setup frame is transmitted by applying MCS level 0,
wherein a data signal corresponding to each of the plural second STAs is transmitted using a best sector for each of the plural STAs through a corresponding RF module among the plurality of RF modules, and
wherein when the data signal is transmitted by using the MU-MIMO scheme, frequency bands operated by the plurality of RF modules are identical.

8. A station (STA) operating in a wireless local area network (WLAN) system, the STA comprising:
a transceiver having one or more Radio Frequency (RF) chains and configured to transmit and receive signals to and from an access point (AP); and
a processor connected to the transceiver to process the signals transmitted and received by the transceiver,
wherein the processor controls the transceiver to:
acquire information on a best sector of the STA during association with the AP and transmit the information on the best sector to the AP;
receive a setup frame including:
first information indicating a plural second STAs among the plurality of first STAs, and
second information indicating that the setup frame corresponds to a setup frame for a multi user-multiple input multiple output (MU-MIMO) scheme or a setup frame for a frequency division multiplexing access (FDMA) scheme from the AP by operating in an omni reception mode;
when the setup frame is received, change an reception mode of the STA from the omni reception mode to a directional reception mode according to the information on the best sector; and
receive a data signal from the AP by operating in the directional reception mode according to the information on the best sector by using the MU-MIMO scheme or the FDMA scheme according to indication of the second information,
wherein the setup frame is transmitted by applying Modulation and Coding Scheme (MCS) level 0, and
wherein the data signal is transmitted by applying an MCS level higher than the MCS level 0.

* * * * *